Sept. 19, 1967      J. H. HOLLYDAY      3,342,309
ELECTRIC SPEED CONTROL FOR BALE THROWER
Filed June 2, 1966                2 Sheets-Sheet 1

INVENTOR.
JAMES H. HOLLYDAY
BY Donald D. Schaper
ATTORNEY

Sept. 19, 1967     J. H. HOLLYDAY     3,342,309
ELECTRIC SPEED CONTROL FOR BALE THROWER
Filed June 2, 1966     2 Sheets-Sheet 2
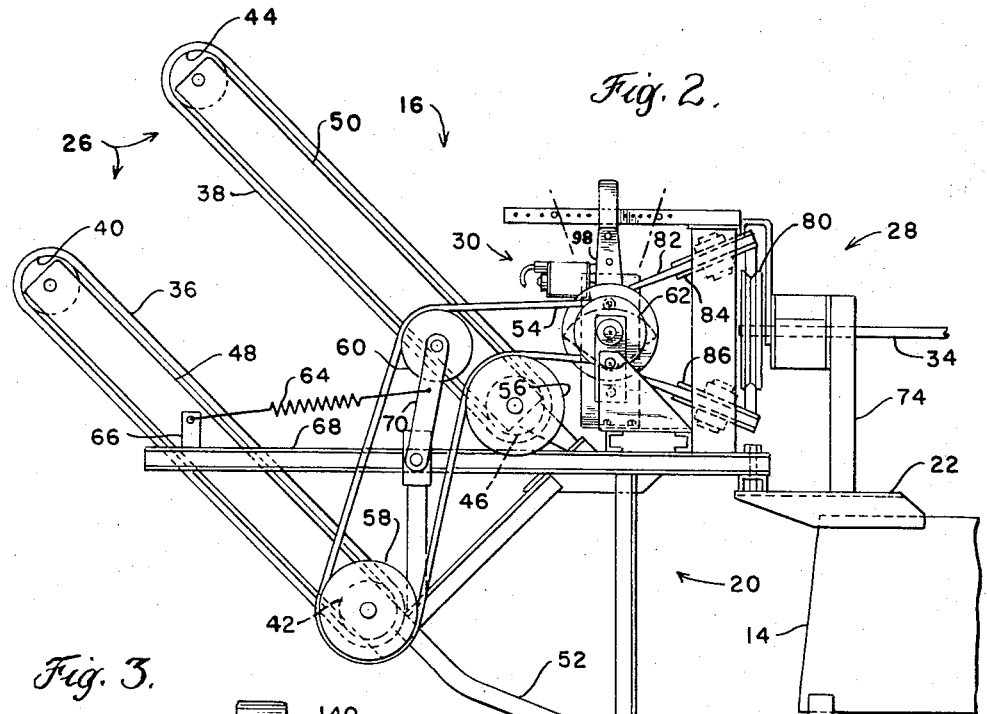
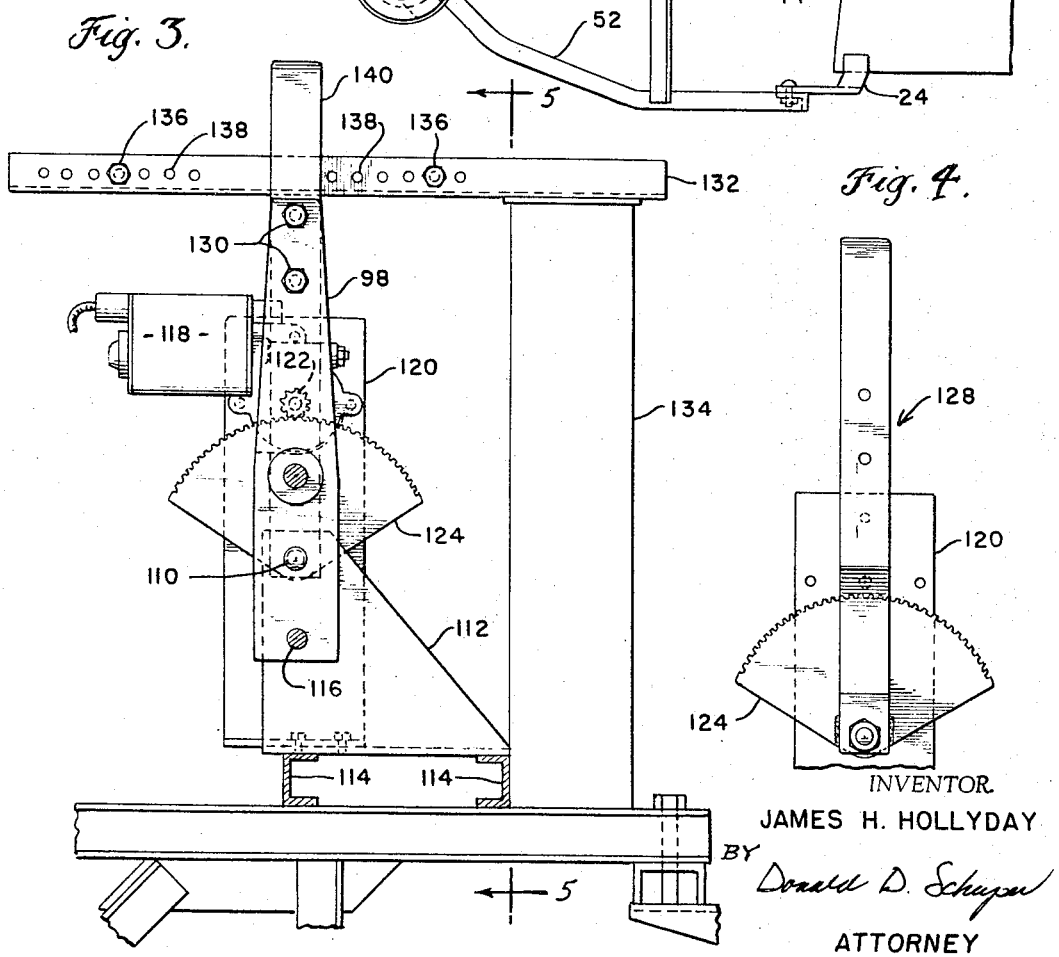
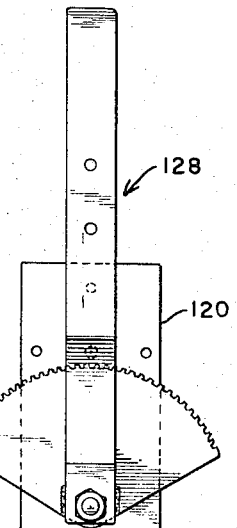
INVENTOR.
JAMES H. HOLLYDAY
BY Donald D. Schuyler
ATTORNEY

United States Patent Office 3,342,309
Patented Sept. 19, 1967

3,342,309
ELECTRIC SPEED CONTROL FOR BALE THROWER
James H. Hollyday, New Holland, Pa., assignor to Sperry Rand Corporation, New Holland, Pa., a corporation of Delaware
Filed June 2, 1966, Ser. No. 554,792
6 Claims. (Cl. 198—110)

ABSTRACT OF THE DISCLOSURE

A device in a bale thrower for regulating the speed of bale projecting means in which the effective diameters of a pair of split sheves are varied by an electrically actuated control.

This invention relates to bale handling apparatus of the type which is mountable on a pick-up baler and is adapted to be driven from a power source on the baler. More particularly, the invention relates to an improved means for selectively controlling the speed at which the thrower is operated.

In a bale thrower of the type to which this invention is particularly applicable, the bales are thrown or trajected by a pair of cooperating endless belts which act on opposite sides of the bale. The distance a given bale is thrown is controlled by regulating the speed of the belts. Various manually operated devices are known for regulating the speed of the belts. One example of such a speed control device is shown in the U.S. patent to Hollyday, 3,127,977, issued April 7, 1964.

Speed control devices for bale throwers are normally controlled by the operator from the tractor seat during the baling operation. It has been found that operators tend to leave the speed control at a fast speed setting, instead of systematically varying the speed so that the belts rotate only fast enough to throw the bales the needed distance. This is an undesirable practice on the part of the operator, since the belt life is much longer at slow speeds.

Accordingly, one object of this invention is to provide a speed control means, in a bale thrower of the type described, which can be adjusted by the operator with a minimum of time and effort.

Another object of this invention is to provide a bale thrower speed control which facilitates the operation of the thrower at optimum speeds under all operating conditions.

Another object of this invention is to provide a mechanically operated speed control means which can be precisely set and which accurately maintains a speed setting.

Another object of this invention is to provide a bale thrower speed control means which is easily adapted for turning movements of the bale thrower.

A further object of this invention is to provide a bale thrower speed control means which is of greatly simplified construction and requires little maintenance throughout its operative life.

A still further object of this invention is to provide a bale thrower speed control with means for varying the range of speeds through which the thrower is operated.

Other objects of this invention will beapparent hereinafter from the specification and from the recital in the appended claims.

FIG. 2 is a fragmentary enlarged side elevation of the bale thrower and showing the attachment to the discharge end of the baler;

FIG. 3 is a further enlarged elevational view of the speed control unit, taken as indicated by the arrows 3—3 in FIG. 5;

FIG. 4 is a detailed view of the gear segment, the lever which carries the gear segment, and the transfer arm;

Figure 1:
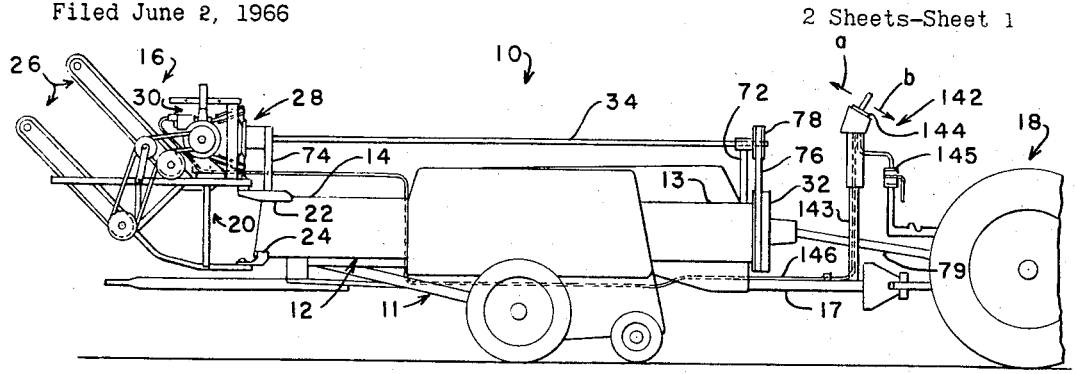
FIG. 1 is a side elevational view of a conventional pick-up baler equipped with a bale thrower and the speed control mechanism of this invention.

Referring now to the drawings by numerals of reference, and particularly to FIGS. 1 and 2, 10 denotes generally a pick-up hay baler of conventional construction and comprising a wheel supported frame 11, a bale case 12 mounted on the frame and having a forward end 13 and a rearward discharge end 14 from which bales successively emerge, and a bale thrower 16 pivotally mounted on discharge end 14. A tongue 17 on the forward end of baler 10 is connected to a tractor or other towing vehicle 18, shown fragmentarily in FIG. 1.

Bale thrower 16 as best shown in FIG. 2, comprises a frame structure 20 mounted for pivotal movement about a vertical axis on discharge end 14 by brackets 22 and 24, bale trajecting means 26 carried on frame structure 20, a drive means 28, and a speed control means 30. Power is supplied to the drive means 28 from the baler flywheel 32 through a longitudinally extending drive shaft 34.

Bale trajecting means 26 comprises a lower belt 36 and an upper belt 38; belts 36 and 38 are carried respectively on lower belt rollers 40 and 42, and upper belt rollers 44 and 46. Lower belt rollers 40 and 42 are rotatably mounted in frame element 48, and upper belt rollers 44 and 46 are rotatably mounted in frame element 50. A pan 52 guides bales into belts 36 and 38 as they are discharged from the baler. Belts 36 and 38 are driven by a V-belt 54 which receives power from drive means 28 through speed control means 30, and which extends around drive sheave 56 connected to roller 46, drive sheave 58 connected to roller 42, an idler sheave 60, and a split sheave 92, in the speed control means 30, hereinafter described. A spring 64 extends between an element 66 on frame member 68 and a pivotally mounted bracket 70 for biasing sheave 60 against belt 54 to maintain the desired tension therein.

Drive means 28, as shown in FIGS. 1 and 2, comprises drive shaft 34 which is journalled at its forward end in support 72 and at its rearward end in support 74. Shaft 34 is driven by baler flywheel 32 through the action of endless belt 76 on sheave 78 fixed to shaft 34. A shaft 79 connects flywheel 32 to the tractor PTO, not shown. Drive shaft 34 has at its rear end a drive sheave 80 which transmits power through an endless belt 82 to split sheave 90 in speed control means 30. Belt 82 is threaded over sheaves 84 and 86 to obtain the necessary right angle change in the direction of rotary motion from the drive means 28 to speed control means 30.

Figures 5, 6:
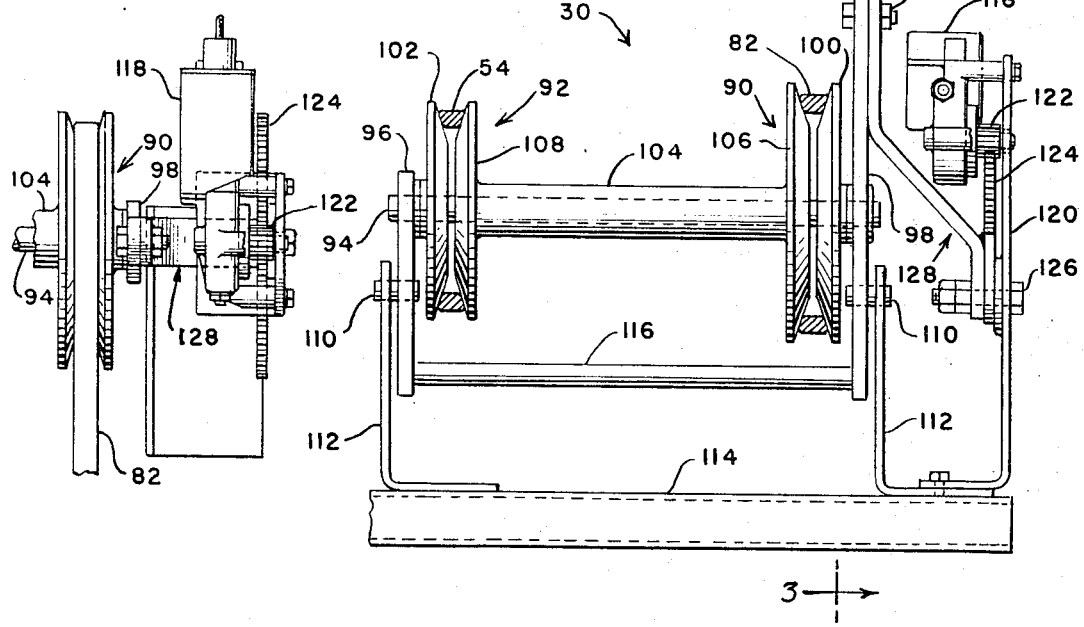
FIG. 5 is a view looking in the direction of arrows 5—5 in FIG. 3.
FIG. 6 is a fragmentary plan view, taken as indicated by the arrows 6—6 in FIG. 5.

Speed control means 30 (see FIGS. 2–6) comprises a pair of split sheaves 90 and 92 mounted on a shaft 94 which is journalled at one end in lever 96 and at the other end in lever 98. Sheave 90 has one segment 100 which is fixed to shaft 94 and against longitudinal movement therealong, and sheave 92 has a similar fixed segment 102. A sleeve 104, as shown in FIG. 5, is slidably mounted on shaft 94 and is fixed at one end to a movable segment 106 in sheave 90 and at the other end to a movable segment 108 in sheave 92. Levers 96 and 98 are mounted on pivot pins 110 in L-shaped brackets 112 which are fixed to cross member 114 in frame structure 20. A brace 116 serves to strengthen levers 96 and 98 and prevent relative pivotal movement therebetween.

An electric drive motor 118 is provided in speed control means 30 for moving the split sheaves to a desired position; motor 118 is fixed on a vertically extending element 120 and has a pinion gear 122 which meshes with a gear segment 124 pivotally mounted on element 120 by bolt 126. A transfer arm 128 is fixed to segment 124 and connected to lever 98 by bolts 130 so that as gear segment 124 is moved through a given arc by drive motor 118, lever 98 is moved through the same arc. A stop means is provided to limit the angular travel of arm 128 and the lever 98 fixed thereto and comprises a horizontally extending element 132 on support post 134 (see FIG. 3), and bolts 136 for selective mounting in holes 138 to provide the abutments for end 140 of arm 128. The distance between bolts 136 can be varied to limit the angular travel of arm 128 and thereby regulate the range of speed through which the thrower belts are operated.

A switch means 142 for actuating drive motor 118 is mounted on baler tongue 17 and comprises a vertical support 143, a conventional three-position switch 144, a suitable plug 145 for connecting switch means 142 to an electrical power source, not shown, on the towing vehicle 18, and an electrical wire 146 which runs to motor 118.

Operation of the device is as follows:

Drive shaft 34, driven from the baler flywheel 32, will furnish power through the speed control means 30 to rotate endless bale trajecting belts 36 and 38. Each emerging bale will be thrown by the bale thrower as it is moved into position by the baler plunger, not shown. When it is desired to vary the distance the bales are thrown, the operator will actuate drive motor 118 through the switch means 142 on the forward end of the baler.

Movement of switch 144, from the neutral position shown in FIG. 1, in the direction of arrow $a$ will cause drive motor 118 to pivot gear segment 124 in one direction, and when switch 144 is moved in the direction of arrow $b$, motor 118 will be reversed and gear segment 124 will be pivoted in the opposite direction. When it is desired to increase the speed of the belts in the bale thrower, lever 98 is moved toward the left, as shown in FIG. 2, by motor 118. As lever 98 moves toward the left, the segments of sheave 90 will be moved apart and the segments of sheave 92 will move closer together. It will be seen that for a constant speed in belt 82, shaft 94 will be driven faster by sheave 90 when the segments are moved apart to decrease the effective diameter of sheave 90. Also, as shaft 94 rotates sheave 92, the speed of belt 54 will be faster when the segments of sheave 92 are moved together and the effective diameter of sheave 92 is increased. Thus, it is seen that the speed of belt 54 and the drive sheaves of endless belts 36 and 38 attached thereto is increased by the described movement of lever 98. When it is desired to decrease the thrower belt speed, lever 98 is moved in the opposite direction.

When lever 98 is moved in either direction until end 140 of arm 128 strikes a bolt 136, further movement is prevented and an overload device in the motor prevents damage to the components. The range of speed through which the thrower is operated can be controlled by positioning bolts 136 is holes 138.

From the foregoing description, it will be seen that the speed control means of this invention is fast, efficient, and can be easily adjusted by the operator through switch means 142. An additional advantage resides in the fact that electrical wire 146 is the only portion of the speed control means which extends from the bale thrower to the baler; thus, the problems normally encountered during turning movements of the thrower when manually actuating components extend from the thrower to the baler are eliminated.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A bale thrower mountable on a hay baler as an extension thereof to receive discharged bales and traject them from the baler comprising in combination a frame structure pivotally mountable on the baler, bale trajecting means carried on said frame structure, a drive means for said bale trajecting means, a speed control means operatively connected to said drive means and said bale trajecting means, said speed control means comprising sheave means on said frame structure, gear means pivotally mounted on said frame structure and operatively connected to said sheave means, a drive motor on said frame structure and in operative engagement with said gear means, switch means connected to said motor for actuating said speed control means, a first element extending vertically upward from a cross member on said frame structure, said drive motor being fixed to said first element at an upper end, and said gear means comprising a gear segment pivotally mounted on said first element adjacent said motor.

2. A bale thrower, as recited in claim 1, wherein a pair of brackets are mounted on said cross member, said brackets are generally in line in a transverse direction with each other and with said first element, and said sheave means is rotatably supported between said brackets.

3. A bale thrower, as recited in claim 1, where one of said brackets is mounted adjacent said first element and the other of said brackets is spaced therefrom, a first lever is pivotally mounted on said one bracket, a second lever is pivotally mounted on said other bracket, a rotatably mounted shaft extends between said levers, said sheave means is supported on said shaft, and a transfer arm extends between said gear segment and said first lever.

4. A bale thrower, as recited in claim 3, wherein said sheave means comprises a pair of split sheaves, each of said split sheaves has a first segment fixed against movement longitudinally on said shaft and a second segment movable therealong, a sleeve over said shaft is connected to said second segments so that movement together of said first and second segments of one split sheave results in movement apart of the first and second segments of the other split sheave to thereby change the effective diameters of each of the split sheaves.

5. A bale thrower, as recited in claim 3, wherein said transfer arm has a vertically extending one end, a pair of stops are mounted on a horizontally extending element connected to said frame structure, and said arm one end is adapted to abut against said stops whereby the angular travel of said arm is limited.

6. A bale thrower, as recited in claim 5, wherein said stops are adjustably mounted in said horizontally extending element whereby the amount of angular travel of said arm can be varied.

References Cited

UNITED STATES PATENTS

| | | |
|---|---|---|
| 2,498,223 | 2/1950 | Rommel. |
| 3,080,953 | 3/1963 | Edgemond _____ 114—144 X |
| 3,090,508 | 5/1963 | Muth _____ 198—110 X |
| 3,095,962 | 7/1963 | Hollyday _____ 198—128 |
| 3,106,852 | 10/1963 | Miller _____ 74—625 X |

HUGO O. SCHULZ, *Primary Examiner.*

EVON C. BLUNK, *Examiner.*

R. J. HICKEY, *Assistant Examiner.*